United States Patent [19]

Wake

[11] Patent Number: 5,680,794

[45] Date of Patent: Oct. 28, 1997

[54] HYDRAULIC CONTROL SYSTEM FOR A TRANSMISSION

[75] Inventor: Bruce Wake, St. Albans, Great Britain

[73] Assignee: New Holland North America, Inc., Del.

[21] Appl. No.: 597,795

[22] Filed: Feb. 7, 1996

[30] Foreign Application Priority Data

Feb. 7, 1995 [GB] United Kingdom ............... 9502343

[51] Int. Cl.$^6$ .................... F16H 59/00; F16H 61/00; F16H 37/06
[52] U.S. Cl. .................... 74/335; 74/336 R; 74/664
[58] Field of Search .................... 74/335, 336 R, 74/664, 331; 192/48.4, 48.5, 48.8; 477/70, 79

[56] References Cited

U.S. PATENT DOCUMENTS

| | | | |
|---|---|---|---|
| 4,497,222 | 2/1985 | Nagaoka et al. | 477/79 X |
| 4,627,312 | 12/1986 | Fujieda et al. | 74/336 X |
| 5,012,416 | 4/1991 | Bulgrien | 74/336 X |
| 5,012,690 | 5/1991 | Bulgrien | 74/335 |
| 5,036,718 | 8/1991 | Bulgrien | 74/335 |
| 5,172,602 | 12/1992 | Jurgens et al. | 74/335 |
| 5,186,291 | 2/1993 | Hedstrom et al. | 192/4 A X |
| 5,390,560 | 2/1995 | Ordo | 74/331 X |
| 5,407,401 | 4/1995 | Bullmer et al. | 477/110 |
| 5,429,005 | 7/1995 | Fukui et al. | 74/335 X |

*Primary Examiner*—Khoi Q. Ta
*Attorney, Agent, or Firm*—Larry W. Miller; John W. Stader; Frank A. Seemar

[57] ABSTRACT

A method is provided for operating a hydraulic control system for a transmission having first and second torque transmission paths arranged in parallel with one another between a common input shaft and a common output shaft, first and second hydraulically controlled clutches arranged in the first and second torque transmission paths, respectively, and a hydraulically controlled gear synchronizer in the second torque transmission path for selectively coupling a shaft for rotation with a gear wheel to effect a change in the transmission ratio through the second torque path while the second clutch is disengaged. To prevent wear on the synchronizer and the gear, prior to activating the hydraulic control for moving the synchronizer into engagement with the gear wheel, the hydraulic control system is operative first to move the synchronizer into a neutral position in which torque cannot be transmitted through the first torque transmission path. The second clutch is then engaged for a predetermined time interval while the synchronizer is in the neutral position to match the speed of the synchronizer to that of the gear wheel 18 with which it is to be brought into engagement.

4 Claims, 2 Drawing Sheets

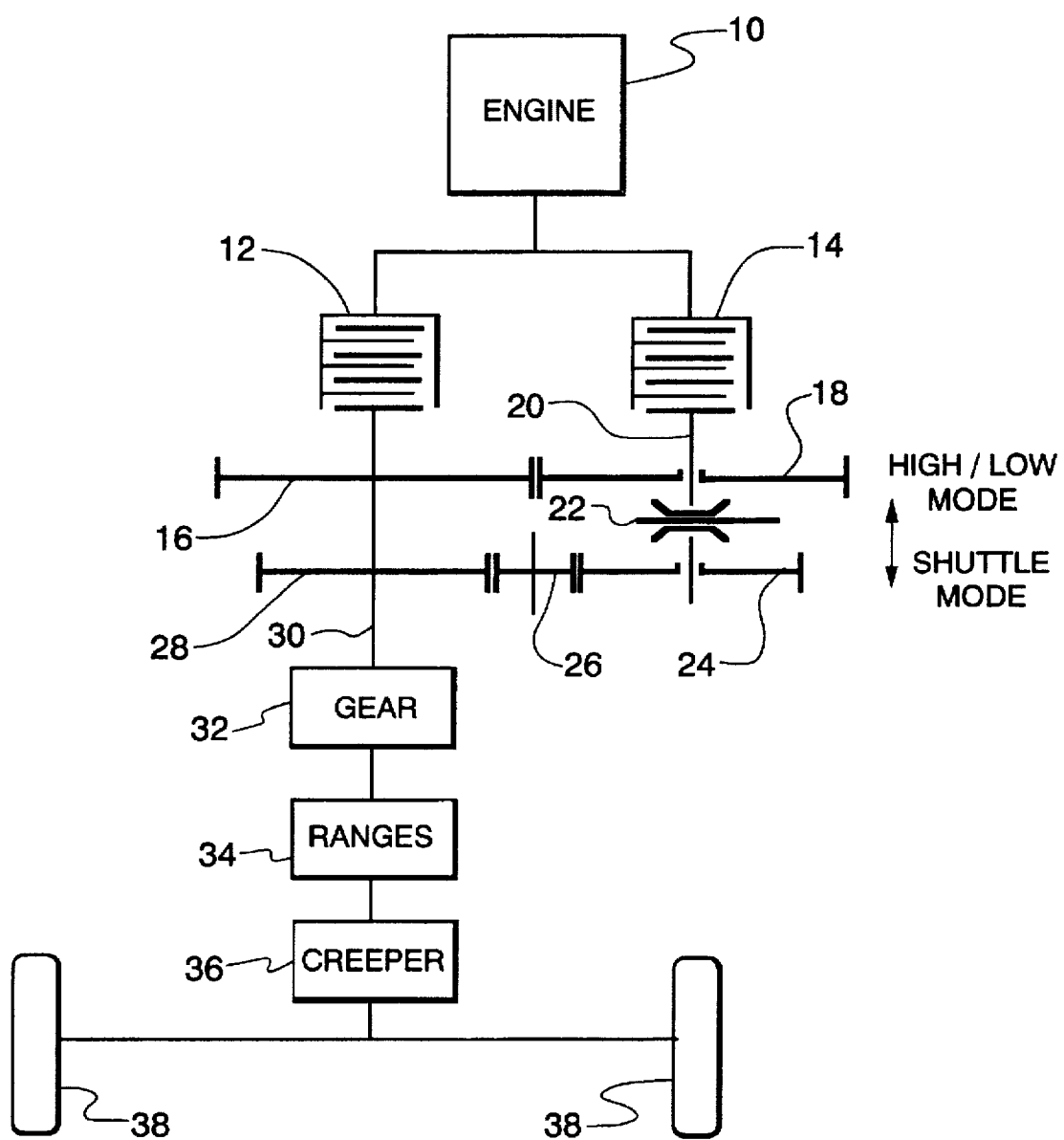

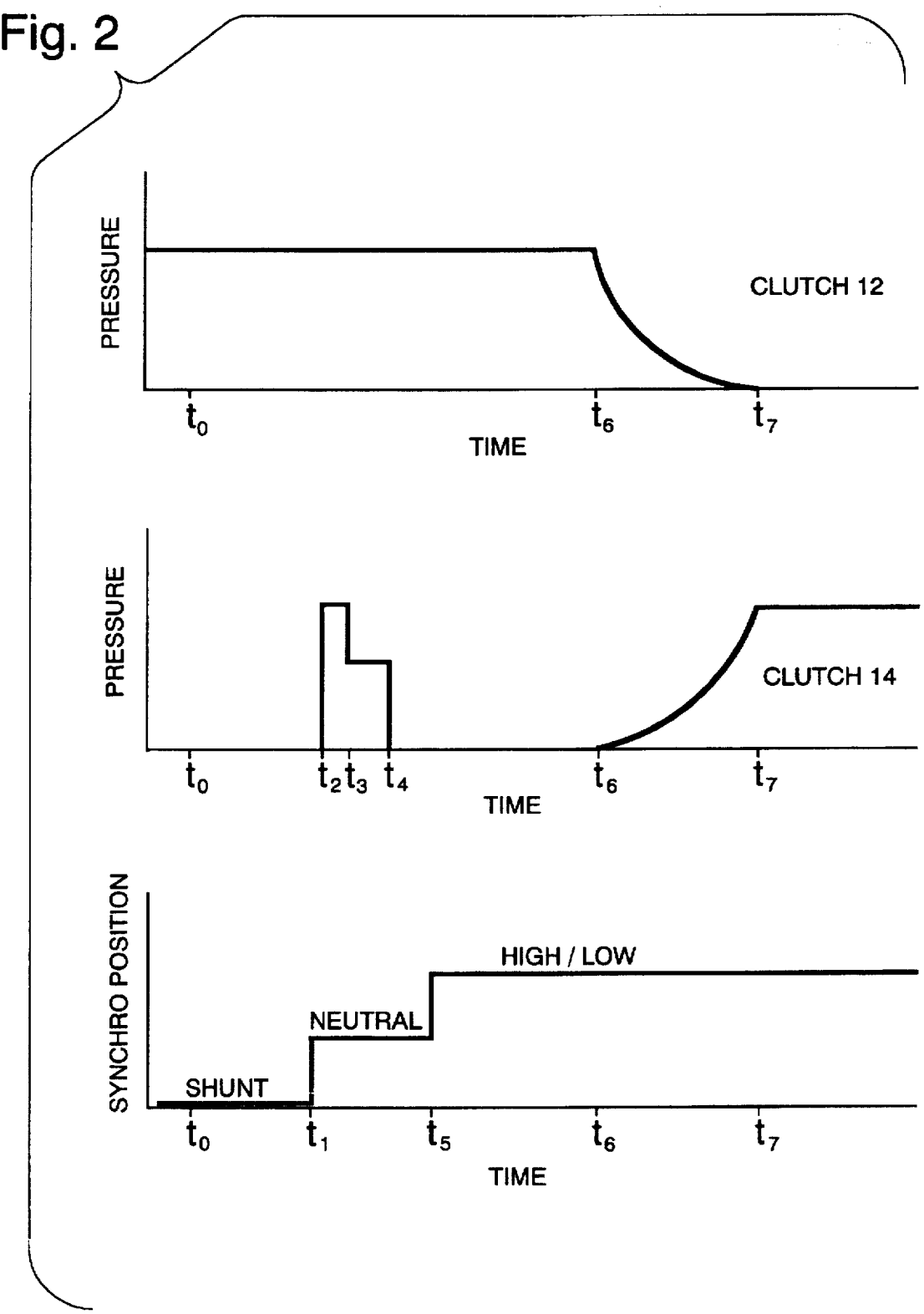

HYDRAULIC CONTROL SYSTEM FOR A TRANSMISSION

BACKGROUND OF THE INVENTION

The present invention relates to a method of operating a hydraulic control system for a transmission of the type in which drive may be transmitted through one of two parallel torque paths by selective engagement of clutches arranged in the respective torque paths. Such transmissions are used in vehicles such as tractors in which it is necessary to be able to change transmission ratios without at any time discontinuing the drive to the wheels and are sometimes referred to as power shift transmissions.

It is known for an engine to drive two wet clutches that lie in parallel torque output paths. The output of one clutch directly drives the input shaft of a gearbox. A first gear that is fast in rotation with the gearbox input shaft directly meshes with a first gear that is rotatably supported on a lay shaft connected to the output of the second clutch. Similarly, a second gear on the gearbox input shaft meshes by way of a reversing idler gear with a second gear that is rotatably supported on the lay shaft driven by the second clutch. A synchronizer movable by a selector over the lay shaft serves to couple the lay shaft selectively for rotation with the first or the second gear.

When the tractor is being driven, one or other of the two clutches is engaged. The effect of switching between the two torque transmission paths, by disengaging one clutch at the same time as engaging the other, depends on the position of the synchronizer. If the synchronizer is engaged with the first gear, then the two torque transmission paths drive the gearbox in the same direction but with different transmission ratios, resulting in a change between a higher and a lower ratio. On the other hand, if the synchronizer is engaged with the second gear, then the torque is reversed when transmitted through the path containing the second clutch on account of the idler gear and switching between the two torque transmission paths causes shuttle shifting or shunting, that is to say the tractor changes between a low forward gear and reverse gear.

Movement of the synchronizer is carried out while the second clutch is disengaged to select the operating mode, that is to say to switch between High/Low Mode and Shuttle Mode. When the clutch is disengaged, the lay shaft is simply floating and its speed of rotation will be determined by the balance of the frictional forces acting on it. For this reason, the synchronizer will not normally be rotating at the same speed as the gear with which it is about to engage, be it the first or the second gear, and if it is simply forced into rapid engagement with the rotating gear while the speeds are mismatched, then wear will be caused to the synchronizer and the gears.

SUMMARY OF THE INVENTION

The present invention therefore seeks to provide a method of operating a hydraulic control system for a transmission of the type in which drive may be transmitted through one of two parallel torque paths by selective engagement of clutches arranged in the respective torque paths, which reduces wear on the mechanical components and permits rapid and smooth engagement of the synchronizer with the gear.

According to a first aspect of the present invention, there is provided a method of operating a hydraulic control system for a transmission having first and second torque transmission paths arranged in parallel with one another between a common input shaft and a common output shaft, first and second hydraulically controlled clutches arranged in the first and second torque transmission paths, respectively, and a hydraulically controlled gear synchronizer in the second torque transmission path for selectively coupling a shaft for rotation with a gear wheel to effect a change in the transmission ratio through the second torque path while the second clutch is disengaged, in which method, prior to activating the hydraulic control for moving the synchronizer into engagement with the gear wheel, the hydraulic control system is operative first to move the synchronizer into a neutral position in which torque cannot be transmitted through the second torque transmission path and then to engage the second clutch for a predetermined time interval while the synchronizer is in the neutral position to match the speed of the synchronizer to that of the gear wheel with which it is to be brought into engagement.

In a second aspect of the invention, there is provided a hydraulic control system for a transmission having first and second torque transmission paths arranged in parallel with one another between a common input shaft and a common output shaft, first and second hydraulically controlled clutches arranged in the first and second torque transmission paths, respectively, and a hydraulically controlled gear synchronizer in the second torque transmission path for selectively coupling a shaft for rotation with a gear wheel to effect a change in the transmission ratio through the second torque path while the second clutch is disengaged, the control system comprising means operative while changing the position of the synchronizer to move the synchronizer through a neutral position in which no torque can be transmitted through the first torque transmission path, and means for engaging the second clutch for a predetermined time while the synchronizer is in the neutral position to match the speed of the shaft to that of the gear wheel.

BRIEF DESCRIPTION OF THE DRAWINGS

A vehicle in accordance with the present invention will now be described in greater detail, by way of example, with reference to the accompanying drawings, wherein:

FIG. 1 is a schematic representation of the drive train of a tractor incorporating the principles of the instant invention; and FIG. 2 comprises three graphs that chart the variation with time of the pressure applied to the actuators of the respective clutches and the synchronizer, respectively, during the course of a change from shuttle mode to high/low mode.

DETAILED DESCRIPTION OF THE PREFERRED EMBODIMENT

In the following description right hand and left hand references are determined by standing at the rear of the tractor facing in a direction of forward travel. Also, in the following description, it is to be understood that terms such as "forward", "rearward", "upward", etc., are words of convenience and are not to be construed as limiting terms.

In FIG. 1, an engine 10 drives two wet clutches 12 and 14 that lie in parallel torque output paths. The output of clutch 12 directly drives the input shaft 30 of a gearbox 32. A first gear 16 that is fast in rotation with the shaft 30 directly meshes with a first gear 18 that is rotatably supported on a lay shaft 20 connected to the output of the clutch 14. Similarly, a second gear 28 on the shaft 30 meshes by way of a reversing idler gear 26 with a second gear 24 that is rotatably supported on the lay shaft 20. A synchronizer 22 may be moved by a selector over the lay shaft 20 in the direction of the illustrated arrows to couple the lay shaft selectively for rotation with the gear 18 or the gear 24.

To provide the multiple gears ratios required in a tractor, the gearbox 32 is connected to the drive wheels 38 through further reduction gearboxes 34 and 36 the first of which allows range selection and the second is a creeper control.

When the tractor is being driven, one or other of the two clutches 12 and 14 is engaged. The effect of switching between the two torque transmission paths, by disengaging one clutch at the same time as engaging the other, depends on the position of the synchronizer 22. If the synchronizer 22 is engaged with the gear 18, then the two torque transmission paths drive the gearbox 32 in the same direction but with different transmission ratios, resulting in a change between a higher and a lower ratio. On the other hand, if the synchronizer is engaged with the gear 24, then the torque is reversed when transmitted through the path containing the clutch 14 on account of the idler gear 26 and switching between the two torque transmission paths causes shuttle shifting, and the tractor changes between a low forward gear and reverse gear.

Movement of the synchronizer 22 is carried out while the second clutch 14 is disengaged to select the operating mode, that is to say to switch between High/Low Mode and Shuttle Mode. When the second clutch 14 is disengaged, the lay shaft 20 is simply floating and its speed of rotation will be determined by the balance of the frictional forces acting on it. For this reason, the synchronizer 22 will not normally be rotating at the same speed as the gear with which it is about to engage, be it the gear 18 or the gear 24, and if it is simply forced into rapid engagement with the rotating gear while the speeds are mismatched, then wear will be caused to the synchronizer and the gears.

The clutches 12 and 14 and the synchronizer 22 are hydraulically driven by actuators to which hydraulic fluid under pressure is supplied from a pressure pump by pressure regulating valves under the control of an electrical control circuit. The actuators are not shown in the drawing as they are generally conventional, consisting for example of piston/ cylinder units connected to solenoid operated pressure regulating valves. The invention is not concerned with the individual elements of the hydraulic control but with the sequence of actuation of the clutches and the synchronizer to effect a rapid and smooth engagement.

Referring now to FIG. 2, a change of position of the synchronizer 22 from Shuttle Mode to High/Low Mode takes place over the time interval from $t_0$ to $t_7$.

While the tractor is being operated in Shuttle Mode with the torque transmitted through the clutch 12 directly to the gearbox 32, a mode change signal is produced by the electrical control circuit to initiate a change in the position of the synchronizer 22. Such a change is made in order that the next time the driver requests a power shift, the tractor will move to a higher forward gear rather than reverse gear.

At this time, no torque is being transmitted through the second torque path containing the second clutch 14, because the clutch is disengaged. At time $t_1$, pressure is applied to the actuator of the synchronizer 22 to move the synchronizer 22 out of engagement with the gear 24.

Conventionally, the actuator would continue to act until the synchronizer 22 is moved into engagement with the gear 18. This has however been found to cause wear because the speeds of the synchronizer 22 and the gear 18 are not well matched.

Instead, therefore, in the present invention the synchronizer 22 is moved to a neutral position in which it meshes with neither of the gears 24 and 18. While the synchronizer is in this neutral position in which torque cannot be transmitted through the second torque path, the clutch 14 is momentarily engaged by applying a high pressure fill pulse during the interval between the instants $t_2$ and $t_3$ followed by a lower pressure during the interval between the instants $t_3$ and $t_4$. The high pressure pulse effects a rapid filling of the hydraulic actuator and overcomes stiction while the lower pressure pulse moves the plates of the second clutch 14 into engagement with one another.

For a short time, the clutch 14 is thus engaged while the synchronizer 22 is in neutral to bring the speed of the synchronizer 22 and the output shaft 20 of the clutch 14 closer to the speed of the gear 18. The clutch 14 is then at the instant $t_4$ once again disengaged and the synchronizer 22 is moved soon thereafter at the instant $t_5$ into its High/Low Mode position in mesh with the gear 18.

Until this point, no change has been made that affects the torque transmitted through the drive train which has continued uninterrupted through the engaged first clutch 12. However, the synchronizer 22 has been moved to the position that will now allow the driver to select the higher ratio available through the clutch 14 and the meshing gears 16 and 18.

A change from low to high gear takes place during the interval $t_6$ to $t_7$, during which the first clutch 12 is gradually disengaged while the second clutch 14 is gradually engaged to effect a power shift, that is to say a change of gear ratios without at any time disconnecting the final drive to the wheels of the tractor.

The above procedure, of engaging the second clutch 14 when the synchronizer 22 is in neutral, may also be adopted when moving from the High/Low Mode to the Shift Mode but this is not essential because a change of mode in this direction has not in practice been found to be a serious cause of wear.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of operating a hydraulic control system for a transmission having first and second torque transmission paths arranged in parallel with one another between a common input shaft and a common output shaft, first and second hydraulically controlled clutches arranged in the first and second torque transmission paths, respectively, to be driven from said common input shaft to provide different alternative rotational speeds for said common output path by providing different respective transmission ratios and a hydraulically controlled gear synchronizer selectively movable in the second torque transmission path for selectively coupling a lay shaft driven from said second clutch for rotation with first and second gears rotatably mounted on said lay shaft to provide opposing directions of rotation of said output shaft through the second torque path, said gear synchronizer being movable while the second clutch is disengaged, comprising the steps of:

prior to activating the hydraulic control for moving the synchronizer into engagement with one of said gears, operating the hydraulic control system to move the synchronizer into a neutral position in which torque cannot be transmitted through the second torque transmission path; and subsequently engaging the second clutch for a predetermined time interval while the synchronizer is in the neutral position to match the speed of the synchronizer to that of the gear with which it is to be brought into engagement.

2. The method of claim 1, wherein the engagement of said synchronizer with one of said gears is effected by the steps of:

first moving the synchronizer into a neutral position;

after the synchronizer has reached the neutral position, applying a high pressure hydraulic fill pulse to the control system of the second clutch followed by a lower pressure pulse of predetermined duration so as to cause a temporary engagement of the second clutch while the synchronizer is in the neutral position to effect a rotation of said synchronizer; and subsequently moving the synchronizer into engagement with the selected one of said gears after the second clutch has been disengaged.

3. In a hydraulic control system for a transmission having first and second torque transmission paths arranged in parallel with one another between a common input shaft and a common output shaft, first and second hydraulically controlled clutches arranged in the first and second torque transmission paths, respectively, to be driven from said common input shaft to provide different alternative rotational speeds for said common output path by providing different respective transmission ratios and a hydraulically controlled gear synchronizer selectively movable in the second torque transmission path for selectively coupling a lay shaft driven from said second clutch for rotation with first and second gears rotatably mounted on said lay shaft to provide opposing directions of rotation of said output shaft through the second torque path, said gear synchronizer being movable while the second clutch is disengaged, the improvement comprising:

means operative while changing the position of the synchronizer to move the synchronizer through a neutral position in which no torque can be transmitted through the second torque transmission path; and means for engaging the second clutch for a predetermined time while the synchronizer is in the neutral position to rotatably drive the rotation of said synchronizer with said lay shaft and, thereby, match approximately the speed of the synchronizer to that of the selected gear to which said synchronizer is to be engaged.

4. The hydraulic control system of claim 3 wherein said first gear permits a forward ratio to be selected through the second torque transmission path, said second gear permitting a reverse ratio to be selected through the second torque transmission path.

* * * * *